(12) United States Patent
Pandit

(10) Patent No.: US 8,767,256 B2
(45) Date of Patent: Jul. 1, 2014

(54) PRINT SHOP MANAGEMENT METHOD FOR CUSTOMIZING COLOR OR BLACK AND WHITE PRINTING

(75) Inventor: Rakesh Pandit, Irvine, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 463 days.

(21) Appl. No.: 12/895,147

(22) Filed: Sep. 30, 2010

(65) Prior Publication Data
US 2012/0081720 A1 Apr. 5, 2012

(51) Int. Cl.
*G06F 15/00* (2006.01)
*G03G 15/08* (2006.01)

(52) U.S. Cl.
USPC ............. 358/1.9; 358/1.15; 358/1.13; 399/53

(58) Field of Classification Search
None
See application file for complete search history.

(56) References Cited

U.S. PATENT DOCUMENTS

| | | | | |
|---|---|---|---|---|
| 4,970,554 A | * | 11/1990 | Rourke | 399/84 |
| 7,647,361 B2 | * | 1/2010 | Thornton et al. | 707/999.202 |
| 8,370,373 B2 | * | 2/2013 | Yamamoto | 707/758 |
| 2004/0090644 A1 | * | 5/2004 | Nishikawa | 358/1.13 |
| 2005/0018299 A1 | * | 1/2005 | Tokoyoda et al. | 359/576 |
| 2005/0174593 A1 | * | 8/2005 | Piersol et al. | 358/1.13 |
| 2007/0229883 A1 | * | 10/2007 | Fujimori et al. | 358/1.15 |
| 2009/0046115 A1 | * | 2/2009 | Seacat et al. | 347/3 |
| 2009/0310152 A1 | * | 12/2009 | Roulland et al. | 358/1.9 |

* cited by examiner

*Primary Examiner* — Steven Kau
(74) *Attorney, Agent, or Firm* — Chen Yoshimura LLP

(57) ABSTRACT

A method implemented in a print shop management system that includes a data processing apparatus having a non-transitory memory for storing a computer software program and a processor for executing the software program, wherein the program includes a program code configured to cause the data processing apparatus to execute a process for customizing color or black and white (B/W) printing of a document containing color and B/W pages, which process includes the steps of analyzing the document to obtain its original color page data which specifies color pages of the document that are originally set to be printed in color, providing a user interface for editing the color page data of the document by allowing input of individual page numbers designating which color pages of the document will indeed be printed in color, and printing the document according to the edited color page data by printing color pages of the document in color if they are also designated to be printed in color, and printing color pages of the document in black and white if they are not designated to be printed in color.

21 Claims, 3 Drawing Sheets

PRINT SHOP MANAGEMENT METHOD FOR CUSTOMIZING COLOR OR BLACK AND WHITE PRINTING

BACKGROUND OF THE INVENTION

1. Field of the Invention

This invention relates to print job management system and method, and in particular, it relates to method implemented in print shops for customizing color or black and white printing of a document containing color and black and white pages.

2. Description of Related Art

Print shop management systems and programs have been developed and widely used to manage print jobs and workflows in an environment where a large number of print jobs are processed with multiple printers. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application.

In a print shop management process, each printing job typically specifies a source file that electrically contains a document to be printed, and the required printing parameters such as the size, color and the type of the paper on which the document should be printed, the printing resolution, duplex or single-side printing, and certain finishing conditions, such as book, staple, collate printing, etc., depending on a print job requester's needs.

In order to process a large volume of print jobs that each differ in terms of these job parameters, a print shop utilizes multiple commercial grade printers, including black & white and color printers, each with often different limitations on available printer settings, such as the paper size, the paper type, resolution settings, etc. In addition, the print shop employs various finishing devices, such as collators, staplers, hole punchers, folding machines, binding machines, etc.

A print shop (or print job) management process is typically implemented by software or firmware programs executed by digital data processing apparatus such as a control computer or server connected to the printers in a print shop. The print shop management system submits each print job to one or more printers and finishing devices to produce the print job. The job submission may be done automatically by the print shop management system, semi-automatically with certain amount of operator intervention, or manually where decisions of how to submit the print jot to appropriate printers or finishing devices are made by an operator.

The print shop management process and system organizes and manages print jobs using database entries, typically referred to as "job tickets". A job ticket specifies values of various print job parameters, and associates itself to the source file(s) to be printed. In one particular example, a job ticket may include a job ticket number, ticket name as well as the values of the following groups of various other job parameters: job information settings, basic settings (e.g., number of copies, orientation of paper, color, collate, offset printing, original paper size, output paper size, paper type, paper source, etc.), layout settings, cover sheet, finishing settings, inter-sheet settings, tab-paper settings, image quality settings, and customer information. A job ticket is associated with a source file (i.e. the document to be printed), and they collectively constitute a print job within the print shop management system.

The print shop management software program may include, among other things, a color-split process which splits a document containing color and B/W pages into a color subset and a black and white (B/W) subset, and sends the color subset to a color printer and the B/W subset to a B/W printer. Accordingly, when a document to be printed (sometimes referred to as "the source document") is mixed with color and B/W pages, it is first determined whether to submit the entire print job (i.e. all pages of the source document) to one or more color printers, or to split the print job into two subsets by submitting the color pages to one or more color printers and the B/W pages to one or more B/W printers. A method for determining whether to split a print job is described in commonly owned, co-pending U.S. patent application Ser. No. 11/395,583, filed Mar. 31, 2006, entitled "Print Shop Management Method and Apparatus for Printing Mixed Color and Black and White Documents", which is incorporated by reference herein in its entirety. Another method for determining whether to split a print job into two sub-jobs that is especially designed for situations where a printing job involves "N-up" printing (multiple pages of the source document to be printed on one sheet of paper), duplex printing (two-sided printing), or mixed paper printing (different paper requirement) is described in commonly owned, co-pending U.S. patent application Ser. No. 11/529,897, filed Sep. 28, 2006, entitled "Print Shop Management Method and Apparatus for Printing Mixed Color and Black and White Documents", which is also incorporated by reference herein in its entirety.

In an exemplary color-split process as described in the above mentioned co-pending applications, a print management software application is executed that receives job tickets. A job ticket typically consists of settings that may be applied to the job (and are supported by the printers, generally) and a Portable Document Format (PDF) file. The PDF file is the document that is printed and to which the job ticket settings are applied. Each job ticket has at least one PDF file attached to it. Another function of the print management software is to read the job ticket settings of a specific job and then match these to available printers that can support the job ticket settings and, thus, can print the attached PDF file.

When a job ticket has a PDF file attached and that job ticket is processed by the print management software, the PDF file is processed by a PDF analyzer, which is a tool that extracts the meta-data of the job. One type of relevant meta-data collected is the color values of the pages. First, the analyzer determines if there are both color and B&W pages in the PDF file; secondly, if there are both types of pages, the analyzer then identifies which of the pages are color pages. Then the program needs to decide how to print the color and B/W pages.

Color pages are expensive to print. If a page only has text on it, it does not necessarily need to be sent to a color printer. Therefore it is desirable to provide the user with the option of removing such pages from the list of color pages. When pages are removed from the list, they default to B&W and will be sent to a B&W printer. Even images/tables/charts with color may need to be printed in B&W to reduce cost. Therefore it is desirable to allow the user to over-ride PDF color values and impose a value of B&W onto any color page, for whatever the reason.

It is also desirable for a print management process to taking into account of duplex printing (i.e., printing on both sides of a page) and "N-up" printing (i.e., taking two or more PDF pages and imposing them on a single printed page). When a PDF file attached to a job has color and B&W pages and if the job ticket has duplex and/or N-Up values selected, it is desirable to provide the user with the ability to apply the user's color printing selection to the duplex or N-Up settings and change all corresponding settings accordingly. For example, if there is a duplex setting for page 3 and 4 as "Color", and page 3 prints on one side of the paper and page 4 prints on the other side, turning the "Color" setting off for page 3 requires that "Color" also be set to Off for page 4 since the two pages print on the front and back of the same piece of paper. Therefore it is further desirable if the print management program can detect such situations, inform the user via a pop-up message on a GUI, and then, if authorized by the user via the pop-up, automatically correct such issues so that duplex and N-Up print can be done properly and consistently.

In a color-split printing process, for example, described in common-owned applications referenced earlier, when a job comes into the print management software program and contains color and B&W pages, the program will understand that this type of job must be printed through a color-split process in which the user selects a color printer and a B&W printer that are joined together for printing jobs with color and B&W pages. It is desirable to identify the color pages and provide the user with a way to modify the original meta-data values of these color pages so they can be printed as B&W on user-specified pages of the color-split document.

It is further desirable to store both the original PDF color values collected via the meta-data and the customer modified PDF color values, so the user can always default back to the original values at any time the user chooses.

SUMMARY

As discussed above, in a color-split process as exemplarily described in the above mentioned commonly-owned co-pending applications, the print management software program uses a PDF analyzer to determine the PDF color value of each page by the embedded meta-data. The present invention further provides a process to allow a user to modify the meta-data gathered when the PDF analyzer reads the PDF file, so that an originally designated color page may be printed as a B/W page.

The present invention process first provides a GUI that reflects the page color values obtained via the meta-data and allows the user to modify this data, specifically, to specify which pages should print in color. This GUI modification creates a modified color profile and this profile is applied to the job when it is sent to a color-split printing process by using designated color and B/W printers. Both the original PDF meta-data and the new (modified) color values are stored, so that the user may default back to the original meta-data at any time.

Additional features and advantages of the invention will be set forth in the descriptions that follow and in part will be apparent from the description, or may be learned by practice of the present invention. The objectives and other advantages of the invention will be realized and attained by the structure particularly pointed out in the written description and claims thereof as well as the appended drawings.

To achieve these and/or other objects, as embodied and broadly described, the present invention provides a process implemented in a print shop management system for customizing color or B/W printing of a document containing color and B/W pages, including the steps of: (a) analyzing the document to obtain its original color page data which specifies color pages of the document that are originally set to be printed in color; (b) providing a user interface for editing the color page data of the document by allowing input of individual page numbers designating which color pages of the document will indeed be printed in color; and (c) printing the document according to the edited color page data by printing color pages of the document in color if they are also designated to be printed in color, and printing color pages of the document in black and white if they are not designated to be printed in color.

In another aspect, the present invention provides a print shop management system comprising a data processing apparatus having a non-transitory memory storing a computer software program and a processor executing the software program, wherein the program includes a program code configured to cause the data processing apparatus to execute above described process for customizing color or B/W printing of a document containing color and B/W pages.

In yet another aspect, the present invention provides a print shop management computer software program product having a computer readable program code embedded in a computer usable non-transitory storage medium for controlling a data processing apparatus, the computer readable program code configured to cause the data processing apparatus to execute the above described process for customizing color or B/W printing of a document containing color and B/W pages by one or more printing devices connected to the data processing apparatus.

The present invention process for customizing color or B/W printing of a document containing color and B/W pages may further include the steps of saving the original color page data of the document and using the original color page data for printing the document if the user input is blank or if the user decides to ignore color intent changes they have made and return to the default color values provided by the meta-data.

The present invention process for customizing color or B/W printing of a document containing color and B/W pages may also include the steps of determining whether a job ticket associated with the document to be printed exists, and generating a job ticket for the document to be printed if no job ticket exists.

The present invention process for customizing color or B/W printing of a document containing color and B/W pages may still include the steps of detecting whether there is a constraint in a duplex or N-up printing of certain pages of the document, and further modifying the color page data if a constraint in duplex or N-up printing is detected and using the further modified color page data for printing the document, or restoring the original color page data if a constraint in duplex or N-up printing is detected and using the original color page data for printing the document.

The present invention process for customizing color or B/W printing of a document containing color and B/W pages further includes the step of saving original color page data of the document to be printed which specify which pages of the document are originally in color, which saved data can be used for the job ticket if the input is blank, or can be used for restoration of color page data in the job ticket by using the saved original color page data of the document to be printed.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for customizing color and B/W printing of print job that contain color and B/W pages by providing user an option to modify color page meta-data parameters, where both the original version and the customized version of the color page meta-data are stored, and then sending the modified job to a color-split printing process. The present invention method may be implemented by a computer software program that has program codes and instructions for implementing the steps of the present invention.

The present invention process is part of a print shop management software program that includes, among other things, a color-split process which processes a document containing both color and B/W pages by splitting the pages into a color subset and a black and white (B/W) subset, and then sends the color subset to a color printer to print and the B/W subset to a B/W printer to print. In such a color-split process as exemplarily described in the above mentioned commonly-owned co-pending applications, the print management program utilizes a tool such as a PDF analyzer to determine the PDF color value of each page by its meta-data. The present invention process then allows a user to modify the color page meta-data gathered by the PDF analyzer, so that a color page may be printed as a B/W page. The modification is performed via a GUI that reflects the page color values obtained from the meta-data, and allows the user to modify the page color data by specifying which pages are to be printed in color. This creates a modified color profile which is applied to the job when it is sent to a color-split printing process by using grouped color and B/W printers. The user modification is also applied to duplex and N-Up printing if there is no constraint error. Both the original color page meta-data and the new/ modified color page values are saved, so that the user can always go back to the original color page meta-data.

Figure 1:
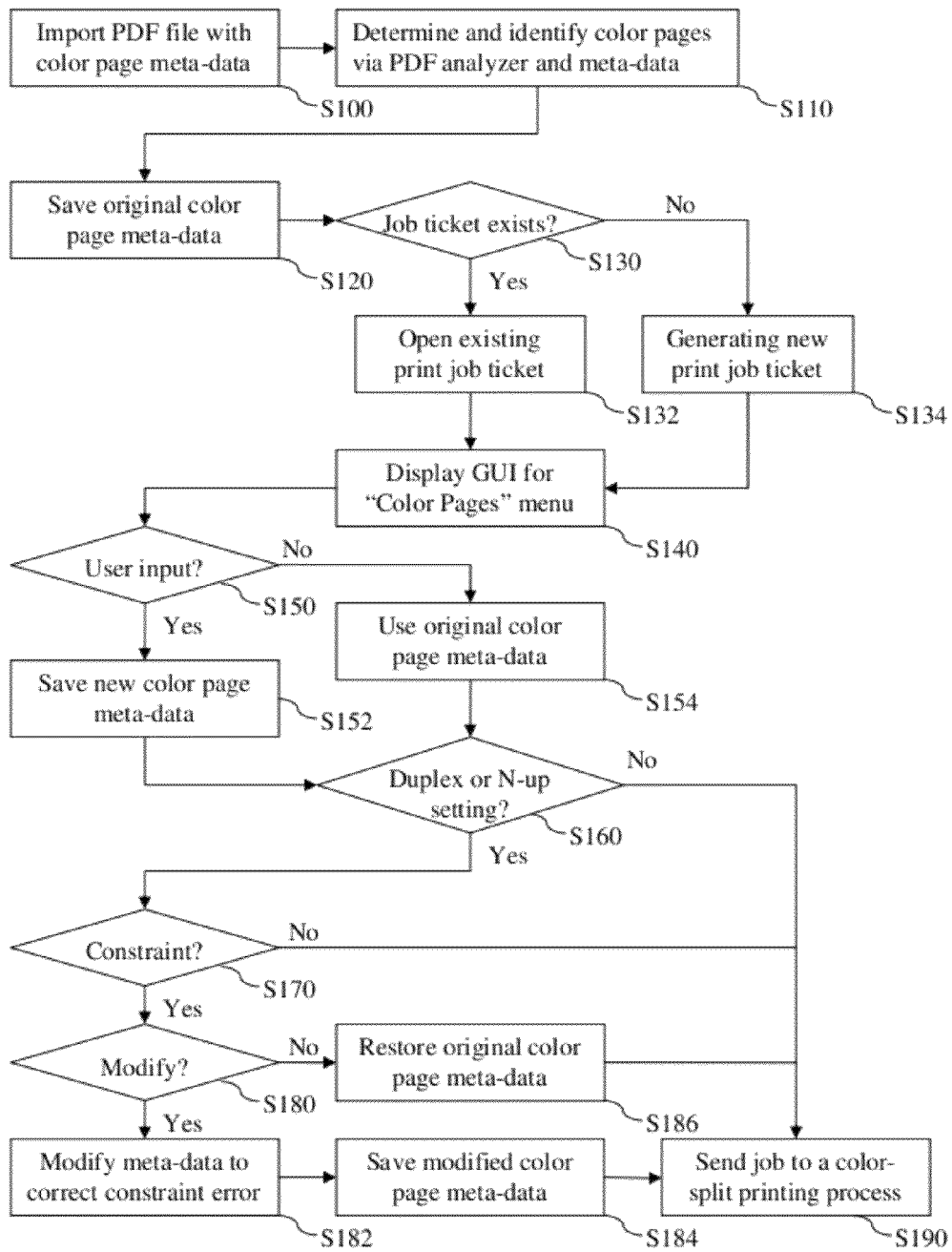
FIG. 1 is a schematic flow chart diagram illustrating an exemplary process for customizing color or B/W printing implemented by a program according to an embodiment of the present invention.

Referring to FIG. 1, there is illustrated an exemplary process implementing the method of the present invention for customizing color or B/W/printing. When a job ticket has a PDF file attached and that job ticket is processed by the print management software, the PDF file is imported into the present invention software program with the color page meta-data (Step S100). The PDF file is processed by a PDF analyzer, which extracts the meta-data of the job and determines and identifies color pages in the document to be printed, as indicated by the meta-data for the color values of the pages (Step S110). The analyzer determines if there are both color and B&W pages in the PDF file. If there are both types of pages, the analyzer identifies which of the pages are color pages. The program can display on a GUI all the pages that the meta-data identifies as "Color".

This original color page meta-data of the PDF file is saved for later retrieval or restoration (Step S120). The next step is to determine whether a print job ticket associated with this imported PDF file (which contains the source document to be printed) exists or not (Step S130). If a print job ticket already exists (which is the usual case), then it will be opened for user editing (Step S132). If a print job ticket does not exist, then a new one will be generated (Step S134), based on meta-data contained in the PDF file and subject to additional editing via user input once the job ticket is created. The present invention focuses on the color page specification or setting of the job ticket. For this task a UI of a "Color Pages" menu will be displayed (Step S140), as exemplarily shown in FIG. 2.

Figure 2:
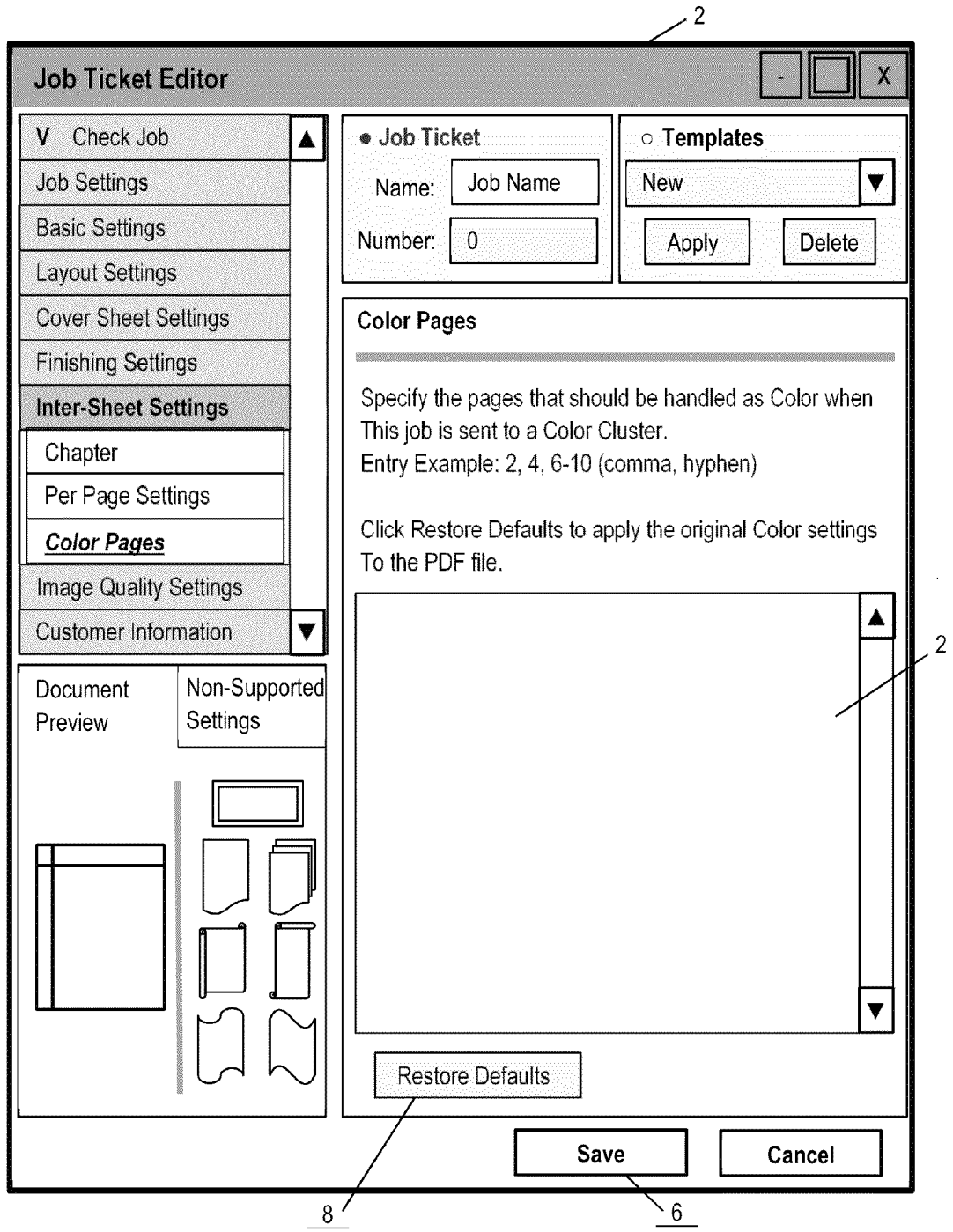
FIG. 2 is a display screen-shot reproduction illustrating an exemplary UI of the program for customizing color or B/W/ printing according to an embodiment of the present invention.

Referring to FIGS. 1 and 2, the "Color Pages" menu 2 allows a user to enter required modifications (Step S150). The application automatically displays all the pages that are Color based on the values read via the meta-data. The user may remove pages from or add new pages to the display in order to specify or select the color pages in the original document that the user indeed wants to be printed in color (and the unspecified or not-selected color pages in the original document will be printed in B/W). The user may enter the color pages of the original document that the user indeed wants to be printed in color in the text field 4. The individual page numbers may be separated with commas. Ranges of pages may be specified by using a hyphen between two page numbers. If a user enter consecutive page numbers separated by commas (e.g., 1, 2, 3, 4, 5), then the program will automatically change it to a range (i.e., 1-5). After inputting the page numbers, the user may click on the "Save" button 6. The program will disregards the original color meta-data of the PDF file and the new data entered by the user will be saved to the job ticket (Step S152). If the user later reopens the Color Pages menu 2 to see this job ticket, the color page numbers entered by the user will be displayed, which may be modified again just as any existing job ticket. If the user wants to return to the original color pages settings (as contained in the PDF file), the user may click the "Restore Default" button 8. The original color page meta-data of the PDF file saved by the program earlier (at Step 120) will be displayed in the text field 4 and saved when the user clicks on the "Save" button.

If, originally, the field is blank, it means that the document does not contain any color pages. If there are originally values and the user removes all these values and leaves the text field 4 blank, the program determines (at Step S150) that there is no color page data, and the job is considered a B/W job and will be kept and saved in the job ticket when the "Save" button 6 is clicked. As a result, if the user later opens the job ticket, the field will remain blank.

Therefore, if the user inputs and saves a new set of color page numbers, they will be used and saved in the job ticket (Step S152). If the user does not input and save a new set of color page numbers (by leaving the text field 4 blank), or later chooses to "restore defaults", the original color page meta-data of the PDF file saved by the program earlier (at Step 120) will be used and saved in the job ticket (Step S154).

The present invention process also checks the color pages setting against other special print settings to see if there is a conflict or constraint problem. Such other special settings may include, for example, the duplex printing (i.e., printing on both sides of a page) and "N-up" printing (i.e., taking two or more PDF pages and imposing them on a single printed page). The program will check to see whether the job ticket for a PDF file with color and B&W pages also has duplex and/or N-up values selected (Step S160) and if so, applies the user's color printing selection to the duplex or N-Up settings and change all corresponding settings accordingly. For example, when there is a duplex setting for page 5 and 6 as "Color", and page 5 prints on one side of the paper and page 6 prints on the other side, if the user modifies the "Color" setting for page 5 to print it in B/W, the program should also require that the "Color" setting for page 6 also be modified since the two pages will be printed on the front and back of the same piece of paper by a B/W printer. However, if only the color value for page 5 is ON (i.e., print in color) but for page 6 is OFF (i.e., print in B/W), then there will be a problem if pages 5 and 6 are print in duplex because these two pages will be printed on the same sheet of paper. So the present invention program will perform a constraint check to detect such a situation (Step S170). If there is no constraint issue, the job will be sent to a color-split printing process (Step S190).

If the program detects a constraint problem, it will provide a pop-up message via a GUI, and when the user authorizes the correction via the pop-up GUI, the application automatically corrects such issues so that duplex and N-Up printing can be done properly and consistently.

As seen in FIG. 1, when the program detects that there is duplex or N-up printing (at Step S160), it will also perform a job ticket constraint check by checking the color page values against duplex or N-up settings (Step S170). If there is a constraint detected (e.g., pages 5 and 6 are to be printed in duplex, but only color value for page 5 is modified and it is now different from the color value of page 6), the program will open, for example, a pop-up message "Constraint detected, application will modify to correct" (Step S180). If the user confirms via the GUI, the program will modify the meta-data to correct error (Step S182) and save the modified data (Step S184) (e.g., using the same example above, the color value for page 6 will be set to "OFF"). If the user does not want to modify, then the constrained value will default back to the original value (Step S186) (e.g., using the same example above, the color value for page 5 will be restored to "ON"). Finally, the print job will be sent to a color-split printing process (Step S190), where the mixed job will be split into a color sub-job and a B/W sub-job, based on the new or modified color page meta-data (or if the user makes no modification, based on the original color page meta-data), such that the pages designated to be printed in color may be printed by one or more color printers, and the pages not designated to be printed in color (either originally B/W pages in the PDF file, or originally color pages in the PDF file but chosen by the user as not to be printed in color) may be printed by one or more B/W printers.

Figure 3:
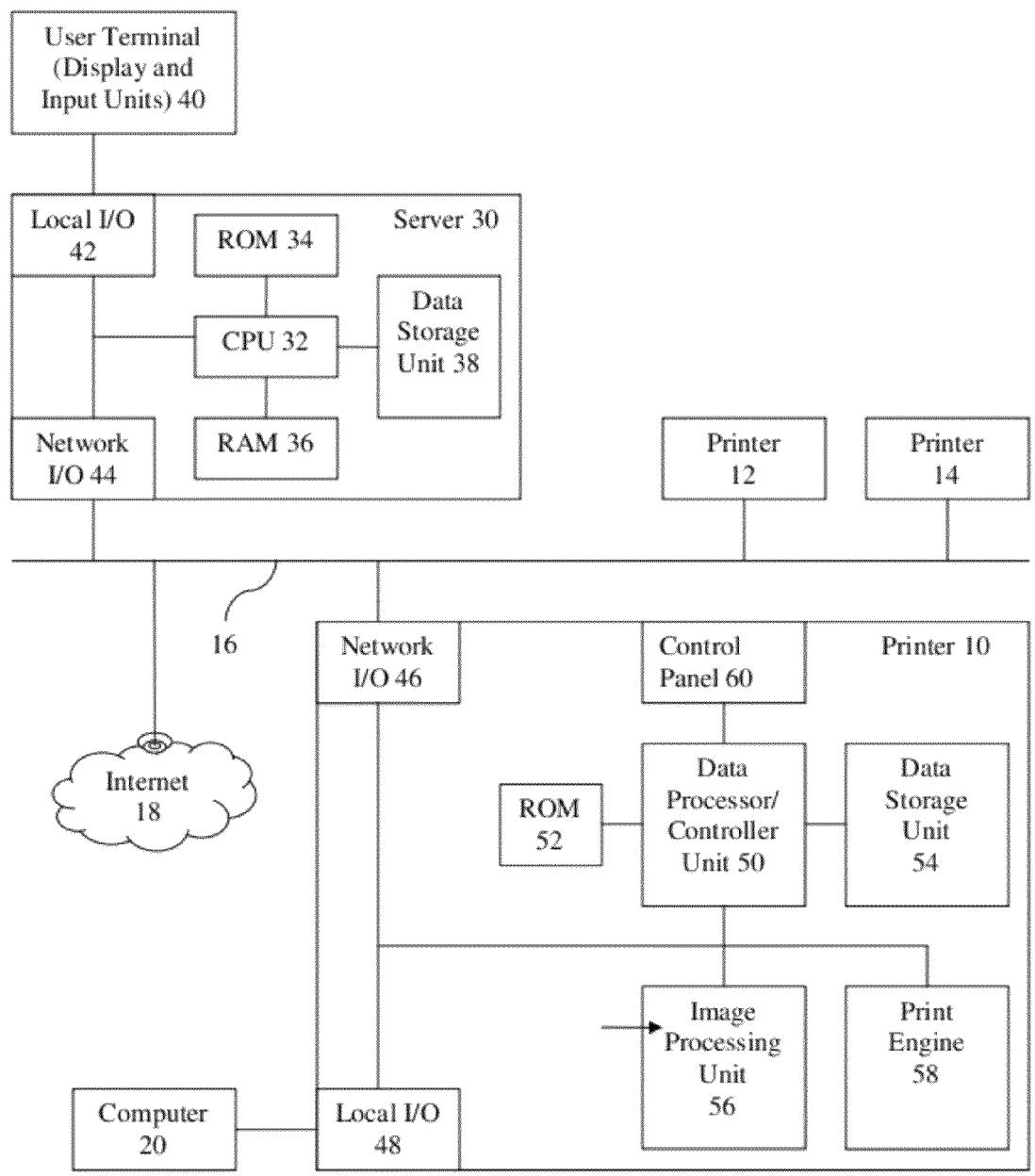
FIG. 3 is a schematic block diagram illustrating an exemplary print shop system having a plurality of printers connected to one or more computers and/or servers directly and/ or via a network in which methods according to embodiments of the present invention may be implemented.

Referring to FIG. 3, there is schematically shown an exemplary print shop system for implementing the present invention. The print shop system include a plurality of color or B/W printers 10, 12, 14, . . . connected to one or more computers 20 and/or servers 30 (or any suitable data processing apparatus) directly or remotely via a data communication channel 16 which may be a wired or wireless network, a dedicated cable or a serial bus connected to the printers. One or more user terminals 40 (each may have its display and input units) may be connected to the server 30 to enable print shop operators and/or users to interact with the server 30 and/or the rest of the print shop system. Alternatively the server may have its own integrated display and input units to enable print shop operators and/or users to interact with the server and/or the rest of the print shop system. The server 30 typically includes a central processor unit (CPU) 32 that controls the function and operation of the server 30 and execute computer instructions and programs that may be installed or saved on a read only memory (ROM) 34, a random access memory (RAM) 36, or a data storage unit 36 (such as a hard disc drive) coupled to the CPU 32. The server typically also has a local input/output (I/O) port 42 for connection with the user terminal 44, and a network I/O port 44 for connection to the data communication channel 16. It is understood that the basic components of the computer 20 are similar to that of the server 30 and therefore will not be repeated in detail here. The server 30 is preferably also connected to an open external network 18 such as the Internet for remotely receiving on-line print jobs. The server 30 is remotely connected to the printer 10 via a network I/O port 46 of the printer 10, whereas the computer 20 may be directly connected to the printer 10 via a local I/O port 48 of the printer 12.

The basic components of the printers 10, 12 and 14 are also illustrated in printer 10, which include a data processor or controller unit 50 that controls the function and operation of the printer 10. The controller unit 50 of printer 10 is connected to a ROM (and/or a RAM) 52 and a data storage unit 54. The software program exemplarily implementing the present invention method and process may be installed on the computer 20 or server 30, but may also be installed on ROM (and/or RAM) 52 or data storage unit 54 (of the printer 10) which may include a non-transitory memory medium, and can be accessed and executed by the controller unit 50. The controller unit 50 is also coupled to and controlling an image processing unit 56 and a print engine 58 of the printer 10. A printer control panel 60 is provided on the printer 10. The control panel 60 is accessible by an operator or user and provides a user interface (UI) that may includes a display screen such as a liquid crystal display (LCD) display screen and user input devices such as keys, buttons, touch screen, etc., for an operator or user to communicate with the printer 10 and control the functions and operations of printer 10.

The exemplary print shop system shown in FIG. 3, in which embodiments of the present invention may be implemented, may also include other devices (not shown) connected to the computer 20, server 30 or network 16, such as scanners, etc. As mentioned above, remote users or customers may also be connected to the "on-line" server 30 or printer 10 via the Internet 18. In addition, the print shop system may also include a number of "off-line" (or "off-network") devices (not shown) that are not connected to the network 16, which devices may be any type of devices used in the print shop, such as finishing devices, prepress devices, etc.

The term "printer" used herein may be small desk-top printers typically seen in an office environment, or large printing systems used in print/copy departments at large organizations or professional print shops. It may also cover other similar image and document processing devices such as copiers or multifunction ("all-in-one") printers that also have copier, scanner and/or facsimile functions. As described above, the printer may be directly attached to a computer or server locally, or connected to a computer or server through a network remotely, where the computer or server are used to generate and send a print job to be processed by the printer through a printer driver which is a computer software program normally installed on the computer or server for converting the document or image to be printed to the form specific to the printer. The printer may have multiple paper trays to store paper of various sizes, color, and types. Further, the printer may be equipped with a sophisticated output sorting mechanism with multiple output trays to perform collate printing or other print finishing functions.

While FIG. 3 shows a print shop environment, the present invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet.

The print shop management software program, including the part for customized print job duplication functions that exemplarily implementing the present invention method and process, may be installed on the computer 20, the server 30 or the controller unit 50 of the printer 10, for managing a large number of print jobs that come into the print shop. As described earlier, the print job management software program organizes and manages print jobs using job tickets.

When a print shop operator executes the print job management software program, the computer 20 or server 30 carries out various functions of the software, including customized duplication of print jobs implementing the method of the prevent invention. The print job management software also utilizes useful features of a user interface (UI) and/or a graphical user interface (GUI) of the computer 20 or server 30 such as a touch-screen and/or a mouse and a keyboard, coupled or combined with a display monitor.

The print shop management software program that implements the present invention method may also be stored in the ROM (and/or RAM) 52 or data storage unit 54 of the printer 10 and executed by the controller unit 50 of the printer 10, utilizing the features and functions of the display panel 60 of the printer 10 for providing a UI and/or GUI to the operator or user of the printer 10.

In the context of this application, each of the devices in the print shop may be generally referred to as a "print job processing device" or "print job processing apparatus", and each of them performs some aspects of print job processing such as job intake, routing, editing, prepress, printing, finishing, etc. Various print job processing devices or apparatus are controlled by various print job management programs, which reside in memories and are executed by processors of the print job processing devices. Each print job management program has a print job database to store print jobs it processes. In this application, the terms "customizable color or B/W printing apparatus" broadly refer to any computer, server, controller unit, and/or data processing apparatus that can implement various features of embodiments of the present invention described below with appropriate hardware/software.

In a preferred print shop management arrangement according to embodiments of the present invention, the server 30 is the under control of the print shop management software program, receives in-house or on-line print jobs from users or customers, process or generate print job tickets, and submits print job tickets and the documents or files to be printed (the "source documents" or "source files") to the one or more printers 10, 12, 14, etc.

The exemplary embodiments of the present invention method and process described herein may be implemented in a print job management programs (software), without requiring special proprietary hardware or firmware.

Although example(s) of the UI displays or GUI used in the process of the present invention are shown and described in detail here (e.g. FIG. 2), the invention is not limited to the specifics of such UI display(s). The invention may be implemented using any forms of UI displays, as long as the UI display includes display means and input means that allow the user to specify various settings and issue commands to the programs. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "user interface (or UI) display" is used to generally mean any suitable screen display that displays information to the user and/or allows the user to input commands and other information, and is not limited to any specific form of display, and may include a series of consecutive displays.

The methods for customizing color or B/W printing provided by embodiments of the present invention have many advantages. It provides an easy and simply way to allow a user to set or modify which of the color pages in an original PDF file (that has already been imported and entered into a print queue management process) will be printed in color or B/W in the printing process. It also provides an easy and simply way to allow a user to revert to (or restore) the original color meta-data of the PDF file such that the color pages of the document can be printed in color as they are originally.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method implemented in a print shop management system for customizing a print job of a document containing color and black and white pages, comprising the steps of:
    (a) extracting meta-data of the print job to identify color pages of the document that are originally set to be printed in color;
    (b) providing a user interface for editing the meta-data by allowing input of individual page numbers designating which color pages of the document will indeed be printed in color;
    (c) detecting whether there is a constraint of color page and black and white page printing mismatch in a duplex or N-up printing of any pages of the document; and
    (d) when no constraint is detected in step (c), printing the document according to the edited meta-data by printing color pages of the document in color if they are also designated to be printed in color, and printing color pages of the document in black and white if they are not designated to be printed in color.

2. The method of claim 1, further comprising the step of saving the original meta-data.

3. The method of claim 1, further comprising the step of using the original meta-data for printing the document if the input is blank.

4. The method of claim 1, further comprising the steps of restoring the original meta-data after editing, and using the original meta-data for printing the document.

5. The method of claim 1, further comprising the steps of determining whether a job ticket associated with the document to be printed exists, and generating a job ticket for the document to be printed if no job ticket exists.

6. The method of claim 1, further comprising the steps of further modifying the meta-data if said constraint in duplex or N-up printing is detected, and using the further modified color page data for printing the document.

7. The method of claim 1, further comprising the steps of restoring the original meta-data if said constraint in duplex or N-up printing is detected, and using the original color page data for printing the document.

8. A print shop management system comprising a data processing apparatus having a non-transitory memory storing a computer software program and a processor executing the software program, wherein the program includes a program code configured to cause the data processing apparatus to execute a process for customizing color or black and white printing of a document containing color and black and white pages, which process comprises the steps of:

(a) extracting meta-data of the print job to identify color pages of the document that are originally set to be printed in color;
(b) providing a user interface for editing the meta-data by allowing input of individual page numbers designating which color pages of the document will indeed be printed in color;
(c) detecting whether there is a constraint of color page and black and white page printing mismatch in a duplex or N-up printing of any pages of the document; and
(d) when no constraint is detected in step (c), printing the document according to the edited meta-data by printing color pages of the document in color if they are also designated to be printed in color, and printing color pages of the document in black and white if they are not designated to be printed in color.

9. The system of claim 8, wherein the process further comprises the step of saving the original meta-data of the document.

10. The system of claim 8, wherein the process further comprises of using the saved original meta-data for printing the document if the input is blank.

11. The system of claim 8, wherein the process further comprises the steps of restoring the original meta-data after editing, and using the saved original meta-data for printing the document.

12. The system of claim 8, wherein the process further comprises the steps of determining whether a job ticket associated with the document to be printed exists, and generating a job ticket for the document to be printed if no job ticket exists.

13. The system of claim 8, wherein the process further comprises the steps of further modifying the color page data if said constraint in duplex or N-up printing is detected, and using the further modified color page data for printing the document.

14. The system of claim 8, wherein the process further comprises the steps of restoring the original color page data if said constraint in duplex or N-up printing is detected, and using the original color page data for printing the document.

15. A print shop management computer software program product having a computer readable program code embedded in a computer usable non-transitory storage medium for controlling a data processing apparatus, the computer readable program code configured to cause the data processing apparatus to execute a process for customizing color or black and white printing of a document containing color and black and white pages by one or more printing devices connected to the data processing apparatus, which process comprises the steps of:
(a) extracting meta-data of the print job to identify color pages of the document that are originally set to be printed in color;
(b) providing a user interface for editing the meta-data by allowing input of individual page numbers designating which color pages of the document will indeed be printed in color;
(c) detecting whether there is a constraint of color page and black and white page printing mismatch in a duplex or N-up printing of any pages of the document; and
(d) when no constraint is detected in step (c), printing the document according to the edited meta-data by printing color pages of the document in color if they are also designated to be printed in color, and printing color pages of the document in black and white if they are not designated to be printed in color.

16. The program of claim 15, wherein the process further comprises the step of saving the original meta-data of the document.

17. The program of claim 15, wherein the process further comprises of using the saved original meta-data for printing the document if the input is blank.

18. The program of claim 15, wherein the process further comprises the steps of restoring the original meta-data after editing, and using the saved original meta-data for printing the document.

19. The program of claim 15, wherein the process further comprises the steps of determining whether a job ticket associated with the document to be printed exists, and generating a job ticket for the document to be printed if no job ticket exists.

20. The program of claim 15, wherein the process further comprises the steps of further modifying the meta-data if said constraint in duplex or N-up printing is detected, and using the further modified color page data for printing the document.

21. The program of claim 15, wherein the process further comprises the steps of restoring the original meta-data if said constraint in duplex or N-up printing is detected, and using the original meta-data for printing the document.

* * * * *